United States Patent [19]
Dickie et al.

[11] Patent Number: 6,070,898
[45] Date of Patent: Jun. 6, 2000

[54] SUSPENSION SYSTEM FOR A WHEELCHAIR

[75] Inventors: Paul C. Dickie, Clovis; Robert A. Taylor, Fresno, both of Calif.

[73] Assignee: Sunrise Medical, Inc., Longmont, Colo.

[21] Appl. No.: 09/134,286

[22] Filed: Aug. 14, 1998

[51] Int. Cl.[7] .............................. B60G 5/04; B62D 21/00
[52] U.S. Cl. ............................ 280/304.1; 280/124.169; 180/907; 180/65.1; 267/279
[58] Field of Search .................... 267/276, 279, 267/153, 141.2; 280/250.1, 304.1, 755, 124.1, 124.166, 124.169; 180/907, 65.1

[56] References Cited

U.S. PATENT DOCUMENTS

| | | | |
|---|---|---|---|
| Re. 28,259 | 12/1974 | Henschen | 267/279 |
| D. 380,991 | 7/1997 | Deming | D12/131 |
| 3,601,424 | 8/1971 | Badland et al. | 280/124 |
| 4,128,137 | 12/1978 | Booth | 180/6.5 |
| 4,436,320 | 3/1984 | Brudermann et al. | 280/242 WC |
| 4,513,832 | 4/1985 | Engman | 180/6.5 |
| 4,900,055 | 2/1990 | Wright | 280/704 |
| 5,435,404 | 7/1995 | Garin, III | 180/6.5 |
| 5,531,284 | 7/1996 | Okamoto | 180/65.1 |
| 5,575,348 | 11/1996 | Goertzen et al. | 180/65.6 |
| 5,848,658 | 12/1998 | Pulver | 180/65.1 |
| 5,851,019 | 12/1998 | Gill et al. . | |
| 5,855,387 | 1/1999 | Gill et al. . | |
| 5,944,131 | 8/1999 | Schaffner et al. | 180/65.1 |
| 5,964,473 | 10/1999 | Degonda et al. . | |

FOREIGN PATENT DOCUMENTS

| | | | |
|---|---|---|---|
| 0 908 165 A2 | 4/1999 | European Pat. Off. | A61G 5/04 |
| 2 051 702 | 1/1981 | United Kingdom . | |
| 90/06097 | 6/1990 | WIPO . | |
| 98/46184 | 10/1998 | WIPO . | |

OTHER PUBLICATIONS

Teftec Corporation, OmegaTrac Product Brochure, Jul. 16, 1997.
Invacare Corporation, Ranger II MWD Product Brochure, 1998.
Permobile, Colours Product Catalogue, p. 4.
Vector Mobility, Inc., Product Catalogue.
Delta REHA Systems GMBH, Product Brochure, Hercules.
BF Goodrich Company, Torbilastic Spring Sales Brochure.

*Primary Examiner*—Brian L. Johnson
*Assistant Examiner*—Avraham H. Lerner
*Attorney, Agent, or Firm*—MacMillan, Sobanski & Todd, LLC

[57] ABSTRACT

A wheelchair suspension system has a resilient front suspension members and resilient drive wheel suspension members. The resilient front suspension members are attached to the front end of the wheelchair base frame assembly. The resilient drive wheel suspension members are attached to opposite sides of the base frame assembly in a spaced apart relation relative to the resilient front suspension members. Each one of the resilient front suspension members supports a front wheel and each one of the resilient drive wheel suspension members supports a drive wheel.

10 Claims, 10 Drawing Sheets

SUSPENSION SYSTEM FOR A WHEELCHAIR

BACKGROUND OF THE INVENTION

This invention relates in general to wheelchairs and more particularly, to wheelchair suspension systems. Most particularly, the invention relates to resilient wheelchair suspensions that support the wheelchair wheels independently of one another.

Wheelchairs generally include a frame that supports a pair of drive wheels and a pair of front casters. The drive wheels and casters are typically rigidly supported by the wheelchair frame. The drive wheels make contact with the ground and are driven to propel the wheelchair. The drive wheels may be driven manually or powered by an electrical motor. The wheelchair supports a seat assembly comprising a seat and a backrest. The seat assembly is oriented above and between the drive wheels and the front casters to provide stability.

A problem with wheelchairs is that the drive wheels and casters typically fail to maintain contact with the ground as the wheelchair negotiates obstacles or irregular ground surfaces. Various attempts have been made to overcome this problem. One such attempt is set forth in U.S. Pat. No. 4,128,137, issued to Eric Booth. The Booth patent describes a suspension comprising a plate carrying a wheel unit and a bogie system. The bogie system comprises two bogie units. Each bogie unit includes a drive wheel and a caster wheel attached to a frame member. The frame members pivot about a common transverse axis defined by brackets mounted to the plate to maintain contact with the ground. Another attempt to maintain contact between the wheel and the ground is set forth in International Patent Application No. PCT/SE89/00647, which describes a wheelchair chassis having a central, transverse main shaft with two drive wheels, and a front and rear pair of wheels, each carried by individual supporting arms which are swingable in a plane.

Another problem with wheelchairs is that they have a tendency to tip backwards upon initial acceleration, or when ascending up an inclined surface or traversing a curb. In light of this problem, anti-tip caster wheels are often provided rearward of the drive wheels. These anti-tip caster wheels are often mounted on arms rigidly coupled to the support frame and are angled downward to a level just above the ground. As the wheelchair begins to tip backwards, the anti-tip caster wheels engage the ground to prevent further tipping.

While anti-tip mechanisms have successfully prevented rearward tipping of the wheelchair, the rigid coupling of the anti-tip caster wheels to the support frame usually provides a fairly abrupt jolt to the wheelchair occupant as the anti-tip caster wheels engage the ground. U.S. Pat. No. 5,435,404, issued to Paul V. Garin III, describes an anti-tip device comprising a spring-biased arm for supporting a rear caster assembly. The spring-biased arm is provided to absorb shock and provide greater comfort for the wheelchair occupant. In addition to absorbing shock, the spring-biased arm is provided to insure that substantially all the wheels and casters maintain contact with the ground.

Another anti-tip configuration is described in U.S. Pat. No. 5,351,774, issued to James Okamoto. The Okamoto patent describes an anti-tip suspension system comprising a pair of suspension arm assemblies pivotally mounted to opposite sides of a wheelchair frame. The suspension arm assemblies are formed to provide variable rate resistance to rearward tipping. The resistance progressively increases as the anti-tip suspension engages the ground. When the suspension arm assemblies are vertically compressed, the resistance rate of the anti-tip suspension increases non-linearly, further resisting rearward tipping.

A resilient device having deformable cushions is described in U.S. Pat. No. 2,729,442, issued to Hermann J. Neidhart. The device includes an outer member and an inner member, each of which are generally square in cross-section. Pockets are formed between the outer and inner members for receiving elastic cushioning elements. The outer and inner members may be of any desired length and are substantially concentric with each other and mounted for relative coaxial rotation. The cushioning elements are in the form of round rods and made of rubber. The cushioning elements are radially compressed to fit in the pockets. When a load is applied to the device in such a manner so as to rotate the inner member relative to the outer member, the cushioning elements are compressed between and outer and inner members. When the load is released, the device has rebound characteristics that cause relative rotation of the outer and inner members in a reverse direction. A lever arm may be rigidly connected to the inner member for applying the load, and the outer member will be held against rotation. Similar devices are described in U.S. Pat. Nos. 5,591,083, issued to Gerhard Kirschey, 3,783,639, issued to Derek J. Goodman et al., 3,482,464, issued to Heinrich Reich et al., 3,436,069, issued to Curtiss W. Henschen, and 2,712,742, issued to Neidhart.

Torsion axles similar to the above described device are described in U.S. Pat. Nos. 5,411,287 and 5,277,450, issued to Curtiss W. Henschen, 5,411,286, issued to Jerry W. Pittman, 4,966,386, issued to Anton Werdich, 4,655,467, issued to James A. Kitzmiller et al., 3,687,479, issued to Kurt Kober, and 3,353,840, issued to Richard R. Love. Suspension systems similar to the above described device are described U.S. Pat. Nos. 3,779,576, issued to George D. Malcolm, and 3,601,424, issued to Barrie J. Badland.

SUMMARY OF THE INVENTION

This invention relates to a wheelchair suspension system comprising a pair of resilient front suspension members and resilient drive wheel suspension members. The resilient front suspension members are attached to the front end of the wheelchair base frame assembly. The resilient drive wheel suspension members are attached to opposite sides of the base frame assembly in a spaced apart relation relative to the resilient front suspension members. Each one of the resilient front suspension members supports a front wheel and each one of the resilient drive wheel suspension members supports a drive wheel.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
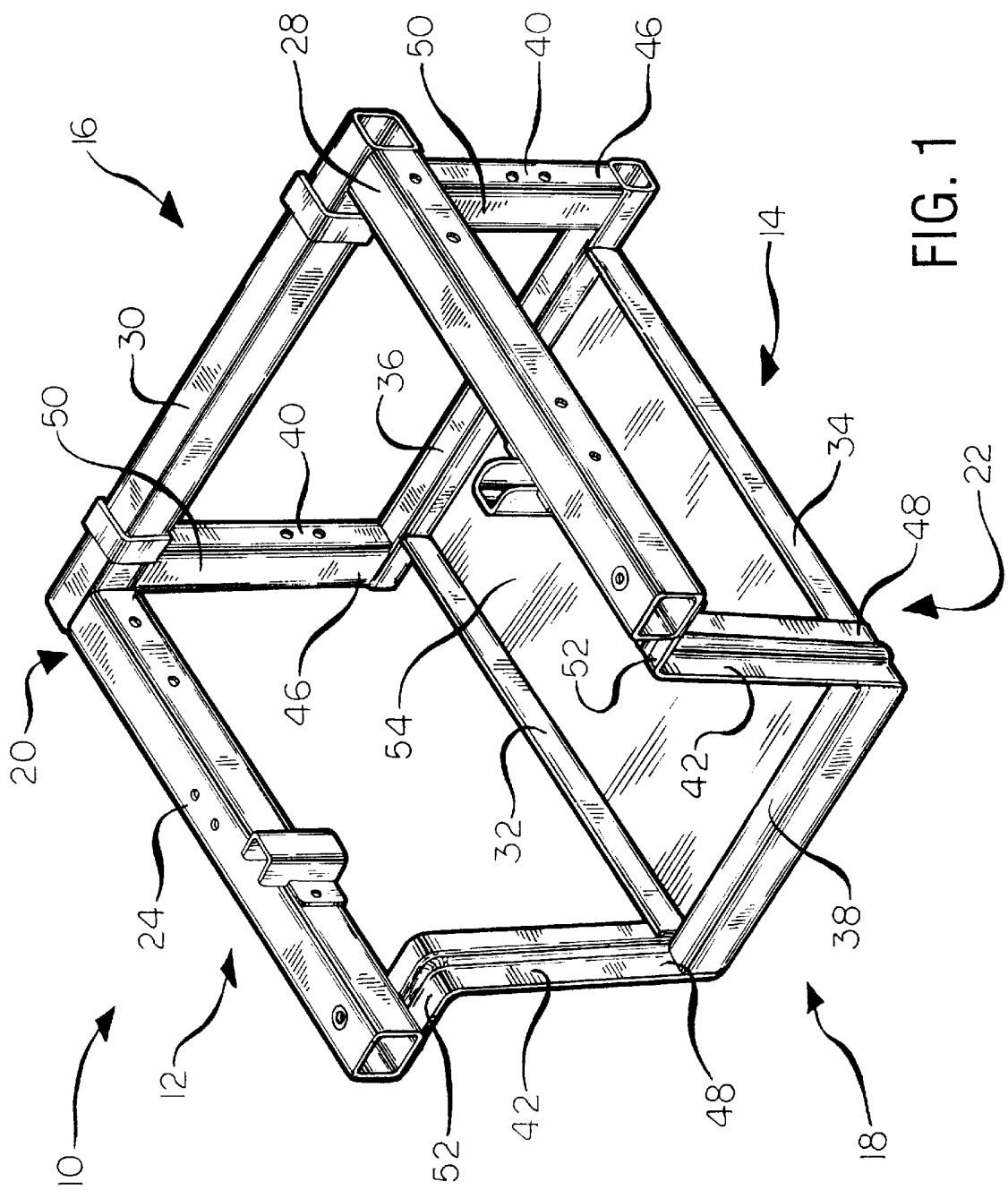
FIG. 1 is a rear perspective view of a base frame assembly useful with the wheelchair suspension system of the invention.

Referring now to the drawings, there is illustrated in FIG. 1 a power wheelchair base frame assembly 10 for supporting a wheelchair seat assembly (not shown). It should be understood that the base frame assembly 10 could be adapted to support any number of suitable wheelchair seat assemblies. It should also be understood that a wheelchair seat assembly could be attached to the base frame assembly 10 in any suitable manner.

The base frame assembly 10 has opposite sides 12, 14, a front end 16, and a rear end 18. A footrest 26 (shown in FIG. 2) extends from the front end 16 of the base frame assembly 10. The base frame assembly further includes an upper frame structure 20 and a lower frame structure 22. The upper frame structure 20 includes opposite sides 24, 28 and a front end 30. The lower frame structure 22 includes opposite sides 32, 34, a front end 36, and a rear end 38. The upper frame structure 20 is spaced apart from the lower frame structure 22 and fixed relative to the lower frame structure 22 by vertically extending structural elements 40, 42. The vertically extending structural elements 40, 42 have lower ends 46, 48 connected to corners of the lower frame structure 22 and upper ends 50, 52 connected to corners of the upper frame structure 20. This configuration forms a base frame assembly having a substantially rectangular construction. A substantially planar panel 54 is rigidly connected to the opposite sides 32, 34, the front end 36, and the rear end 38 of the lower frame structure 22 so as to be rigidly supported by the lower frame structure 22. The planar panel 54 is provided to support a battery (not shown). It should be understood that this base frame assembly 10 described is for merely illustrative purposes and that the invention may be adapted for use with other wheelchair frame assemblies.

Figure 2:
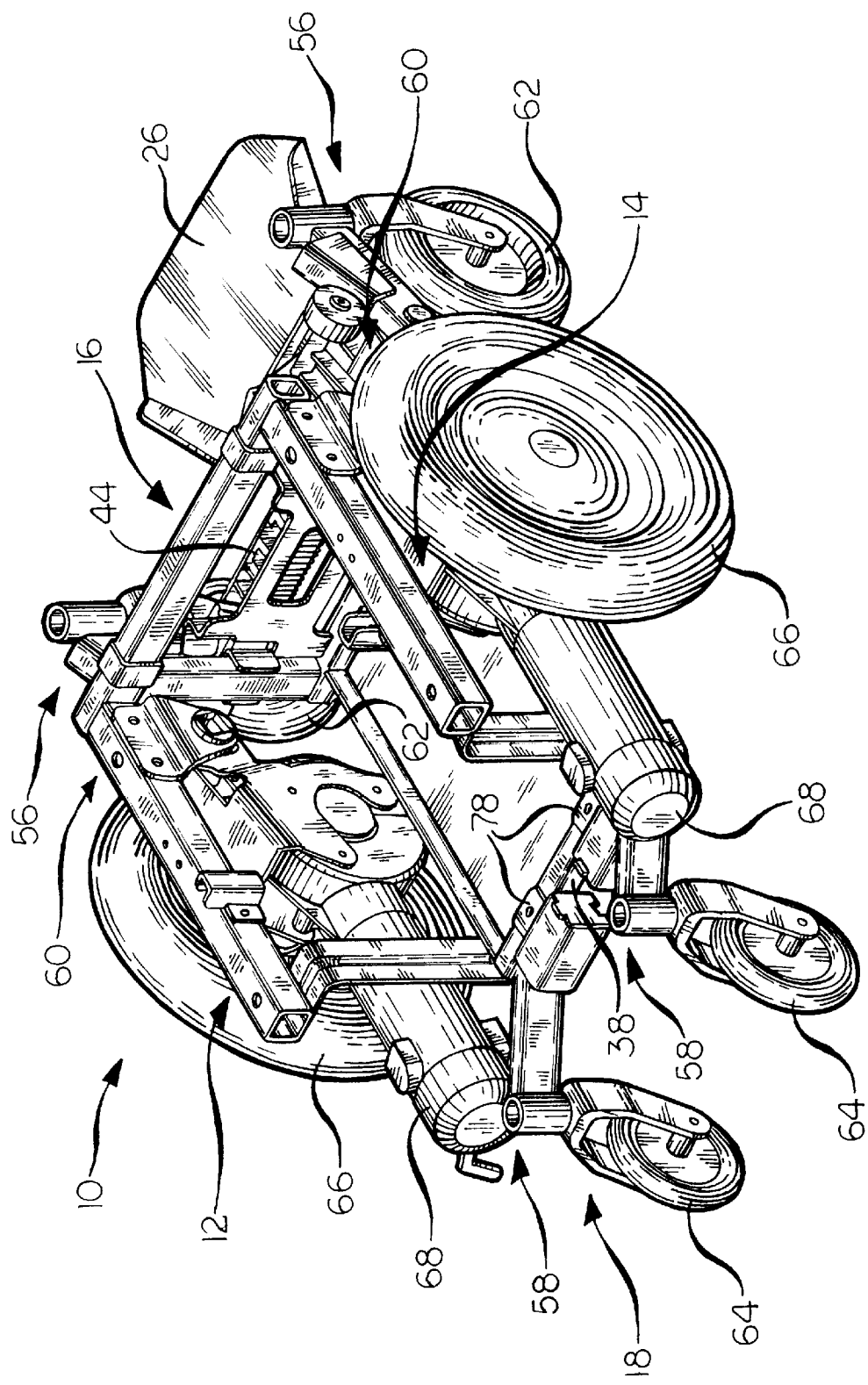
FIG. 2 is a rear perspective view of the base frame assembly shown in FIG. 1, further showing resilient suspension members of the invention attached to the base frame assembly for supporting the wheelchairs wheels, and drive motors and an electronic controller for driving the wheelchair drive wheels.
Figure 8:
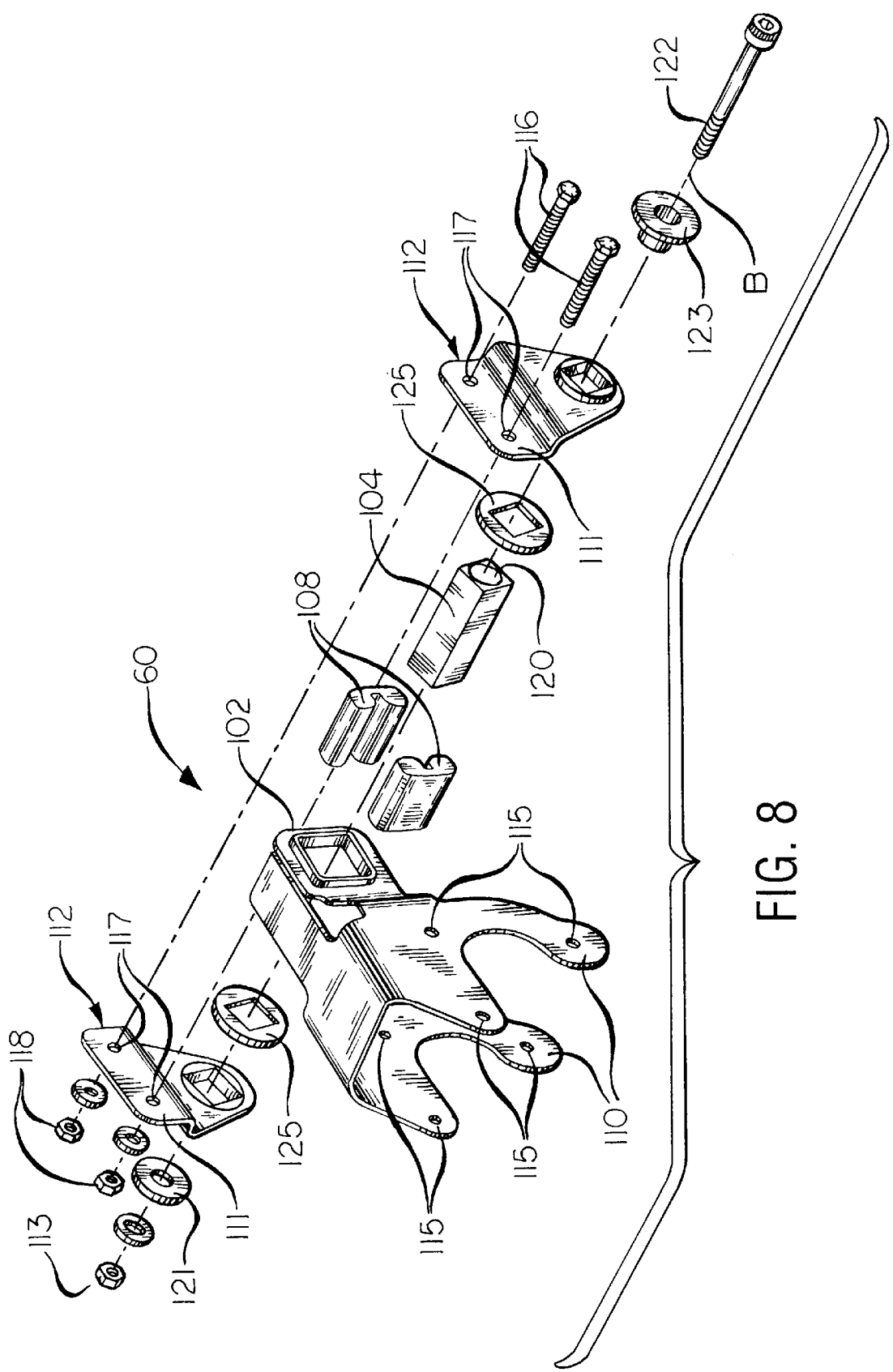
FIG. 8 is an exploded perspective view of the resilient drive wheel suspension member shown in FIGS. 5 and 6.

As shown in FIG. 2, the base frame assembly 10 supports independent resilient suspension members, generally indicated at 56, 58 and 60 (shown more clearly in FIG. 8). The independent resilient suspension members include resilient front suspension members 56, resilient rear suspension members 58, and resilient drive wheel suspension members 60. The resilient front suspension members 56 are attached to opposite sides 12, 14 of the front end 16 of the base frame assembly 10. The resilient rear suspension members 58 are attached to opposite sides 12, 14 of the rear end 18 of the base frame assembly 10. The resilient drive wheel suspension members 60 are attached to opposite sides 12, 14 of the base frame assembly 10 intermediate the resilient front suspension members 56 and the resilient rear suspension members 58.

Each of the resilient suspension members 56, 58, 60 supports a wheel. For example, each of the resilient front suspension members 56 supports a front wheel 62. The front wheels 62 are preferably casters. Each of the resilient rear suspension members 58 supports a rear wheel 64. The rear wheels 64 may also be casters. Lastly, each of the resilient drive wheel suspension members 60 supports a drive wheel 66. The drive wheels 66 are preferably driven by a prime mover, such as the electric motor assembly 68 shown. The electric motor assembly 68 may be controlled by an electrical controller 44 responsive to the occupant's voice or to signals produced by a control wand supported on the armrest (not shown) of the wheelchair. The armrest could be an integral part of the wheelchair seat assembly.

Figure 3:
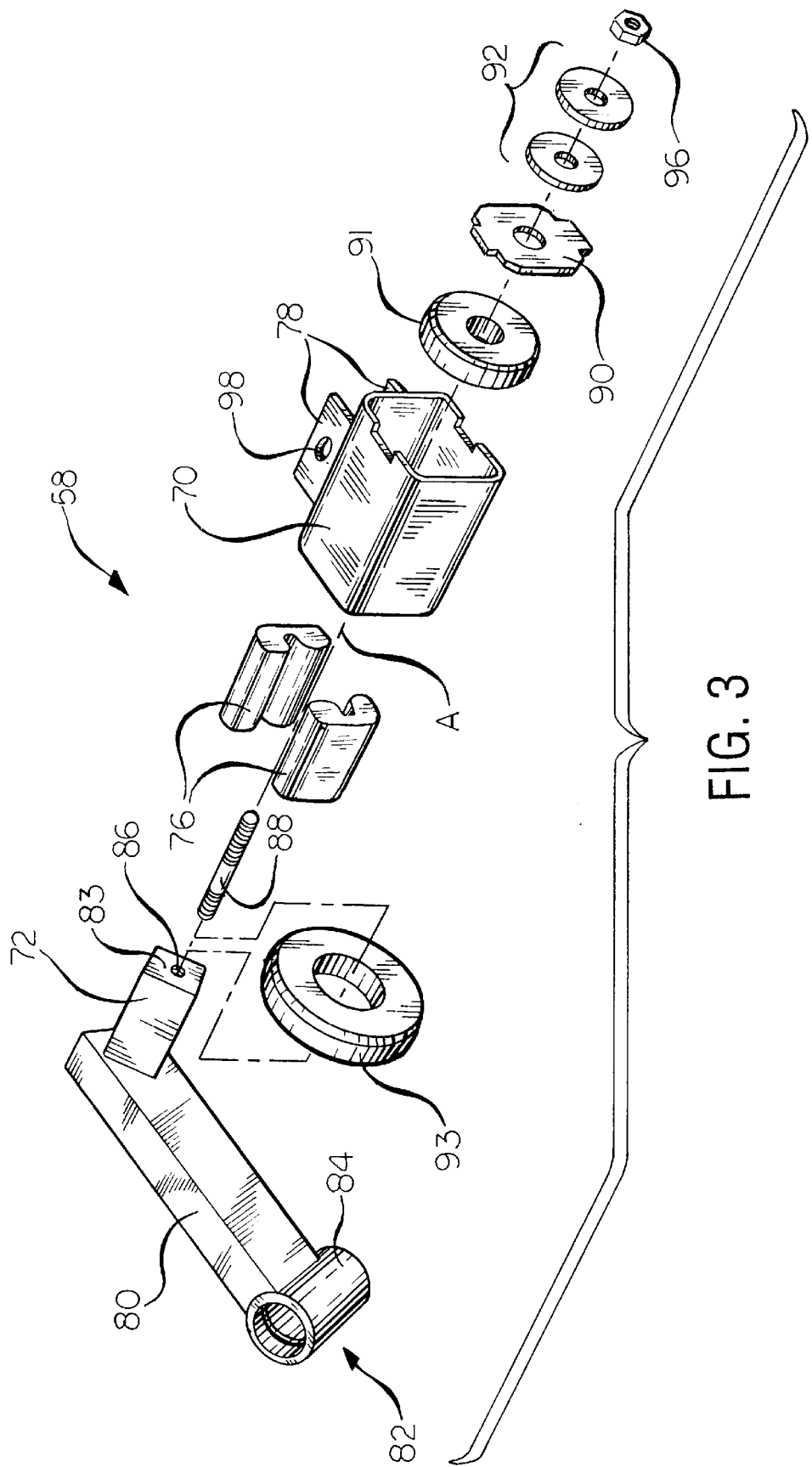
FIG. 3 is an exploded perspective view of a resilient rear suspension member of the invention.
Figure 4:
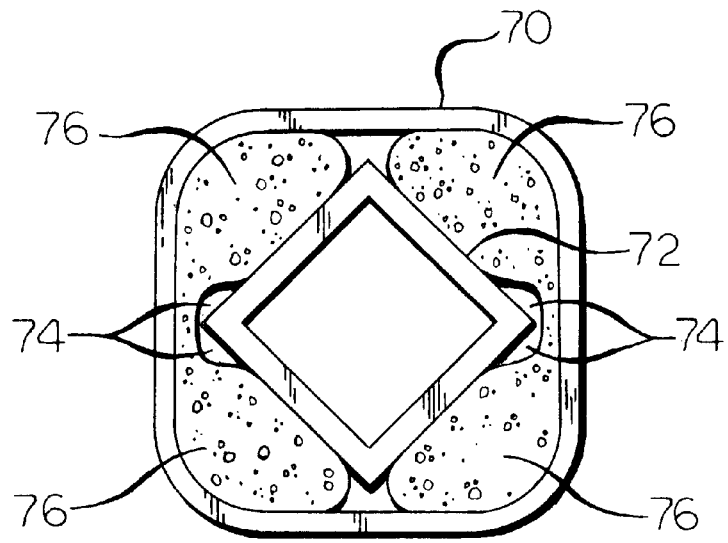
FIG. 4 is an enlarged sectional view of a portion of the resilient rear suspension member shown in FIG. 3.

An example of a resilient suspension member is shown in FIG. 3. Although the resilient suspension member shown is a resilient rear suspension member 58, the resilient front suspension member 56 is configured in a similar manner. The resilient rear suspension member 58 includes an outer structural member 70 and an inner structural member 72 disposed within the outer structural member 70. It is preferable that the outer structural member 70 and the inner structural member 72 be metal. However, it is conceivable that other materials may be suitable for carrying out the invention. Although the outer structural member 70 and the inner structural member 72 are substantially square, other geometric shapes may be employed. As shown in FIG. 4, the outer structural member 70 is positioned out of phase relative to the inner structural member 72 so as to form a plurality of pockets 74 between the outer structural member 70 and the inner structural member 72. Although the outer structural member 70 is positioned ninety degrees out of phase relative to the inner structural member 72, other phase angles may be suitable for carrying out the invention. The relative positions of the outer structural member 70 and the inner structural member 72 may largely depend on the geometric shapes of the structural members 70, 72. A resilient element 76 is disposed within each of the pockets 74. The resilient element 76 is preferably an elastomeric material. Rubber or vulcanized rubber may be a suitable material. It should be understood that the resilient element 76 may be a natural and synthetic material. Urethanes or other polymers may be suitable for carrying out the invention. The inner structural member 72 is rotatable relative to the outer structural member 70 along an axis of rotation, indicated at A. The resistance of the resilient element 76 to compression limits the rotation or torsional movement of the inner structural member 72.

As shown in FIG. 3, a set of spaced apart tabs, generally indicated at 78, extends from an outer surface of the outer structural member 70. The tabs 78 are provided to engage the rear end 38 of the lower frame structure 22, as is clearly shown in FIG. 2. The tabs 78 have holes 98 which co-align with corresponding holes (not shown) in the rear end 38 of the lower frame structure 22 to receive a fastener (not shown) for affixing the outer structural member 70 to the base frame assembly 10. The resilient front suspension member 56 may be attached to the front end 16 of the base frame assembly 10, as shown in FIG. 7, in a similar manner as well.

Continuing with reference to FIG. 3, a lever 80 is shown attached to the inner structural member 72. The lever 80 is provided for supporting the rear wheel 64. The rear wheel 64 is supported at an end 82 of the lever 80 remote from the inner structural member 72. The lever 80 may support the rear wheel 64 in any conventional manner. For example, a caster housing 84 may be provided at the end 82 of the lever 80 for rotatably receiving a caster stem (not shown). An annular space (not shown) may be defined between an inner surface of the housing and the caster stem to receive bearings (also not shown).

An end 83 of the inner structural member 72 remote from the lever 80 has a threaded bore 86 for receiving a threaded stud 88. The threaded stud 88 extends through a cap 90 for the outer structural member 70, and further through a series of washers 92, 94. A lock nut 96 is engageable with the threaded stud 88 so as to confine the outer structural member 70 between the lever 80 and the cap 90. Linear bearings 91, 93 may be employed between the lever 80 and the structural members 70, 72, and further between the inner structural member 72 and the cap 90 to eliminate or reduce axial frictional forces. It should be understood that other friction reduction elements, such as nylon washers (not shown), may be employed as well.

Figure 7:
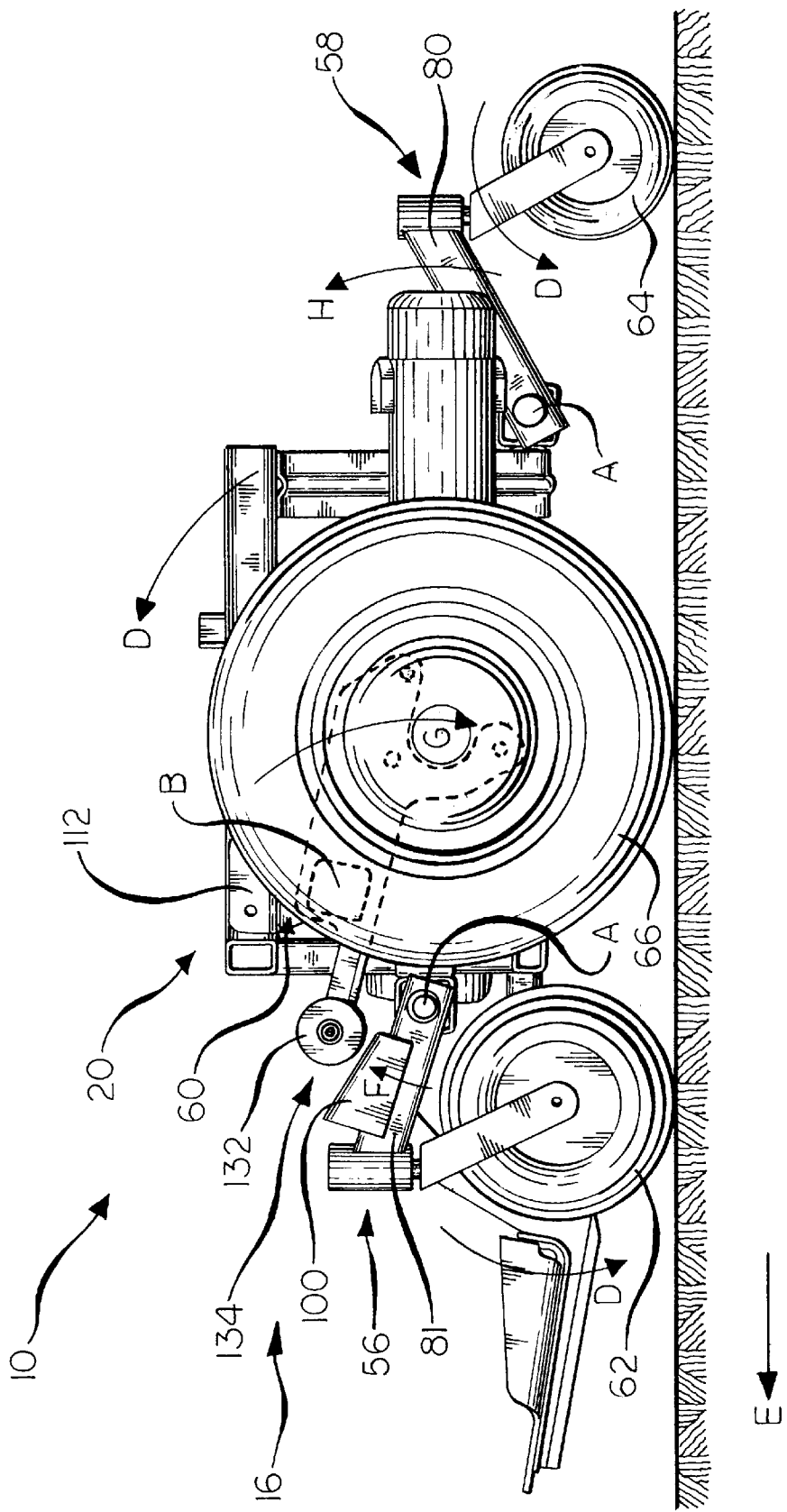
FIG. 7 is an elevational view of the base frame assembly showing relative locations of the resilient front suspension members and the resilient rear suspension members of the invention.

It should be noted with reference to FIG. 7, that the resilient front suspension members 56 and the resilient rear suspension members 58 are attached to the base frame assembly 10 at different relative elevations. It should also be noted that the lengths of the levers 80, 81 and the angular displacement of the levers 80, 81 vary between the resilient front suspension members 56 and the resilient rear suspension members 58. It should further be noted that the front wheels 62 and the rear wheels 64 may be of different dimensions. These characteristics are dependent on one another and may be largely dependent on other physical characteristics of the wheelchair as well.

Unlike the resilient rear suspension members 58, the resilient front suspension members 56 each support a traction acceleration ramp 100. The traction acceleration ramps 100 are preferably welded to the resilient front suspension members 56. However, it should be understood that the traction acceleration ramps 100 may be attached in any suitable manner.

Figure 5:
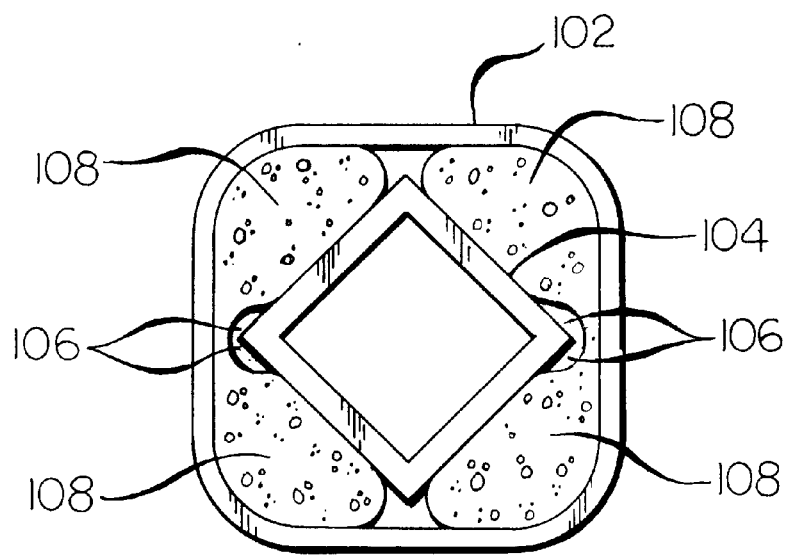
FIG. 5 is an enlarged sectional view of a portion of a resilient drive wheel suspension member of the invention.

The resilient drive wheel suspension members 60 are configured in a manner similar to that of the resilient rear suspension members 58 and the resilient front suspension members 56. As shown in FIG. 8, the resilient drive wheel suspension members 60 each include an outer structural member 102 and an inner structural member 104 disposed within the outer structural member 102. A plurality of pockets 106 (more clearly shown in FIG. 5) are defined between the outer structural member 102 and the inner structural member 104. A resilient element 108 is disposed within each of the pockets 106 (also shown more clearly in FIG. 5). The resilient element 108 is preferably an elastomeric material. As set forth above, the resilient element 108 may be rubber or vulcanized rubber. The resilient element 108 may be a natural or synthetic material. Urethane or other polymers may be suitable for carrying out the invention. The inner structural member 104 is rotatable relative to the outer structural member 102 along an axis of rotation, indicated at B, and the resistance of the resilient element 108 to compression limits such rotation.

A set of space apart tabs, generally indicated at 110, extends from the outer structural member 102. The tabs 110 are provided to support the electric motor assembly 68. Hence, the tabs 110 define a motor mount. The tabs 110 have holes 115 that co-align with corresponding holes (not shown) in the electric motor assembly 68 (shown in FIG. 2) and are adapted to receive fasteners (not shown) for affixing the electric motor assembly 68 to the tabs 110.

Figure 6:
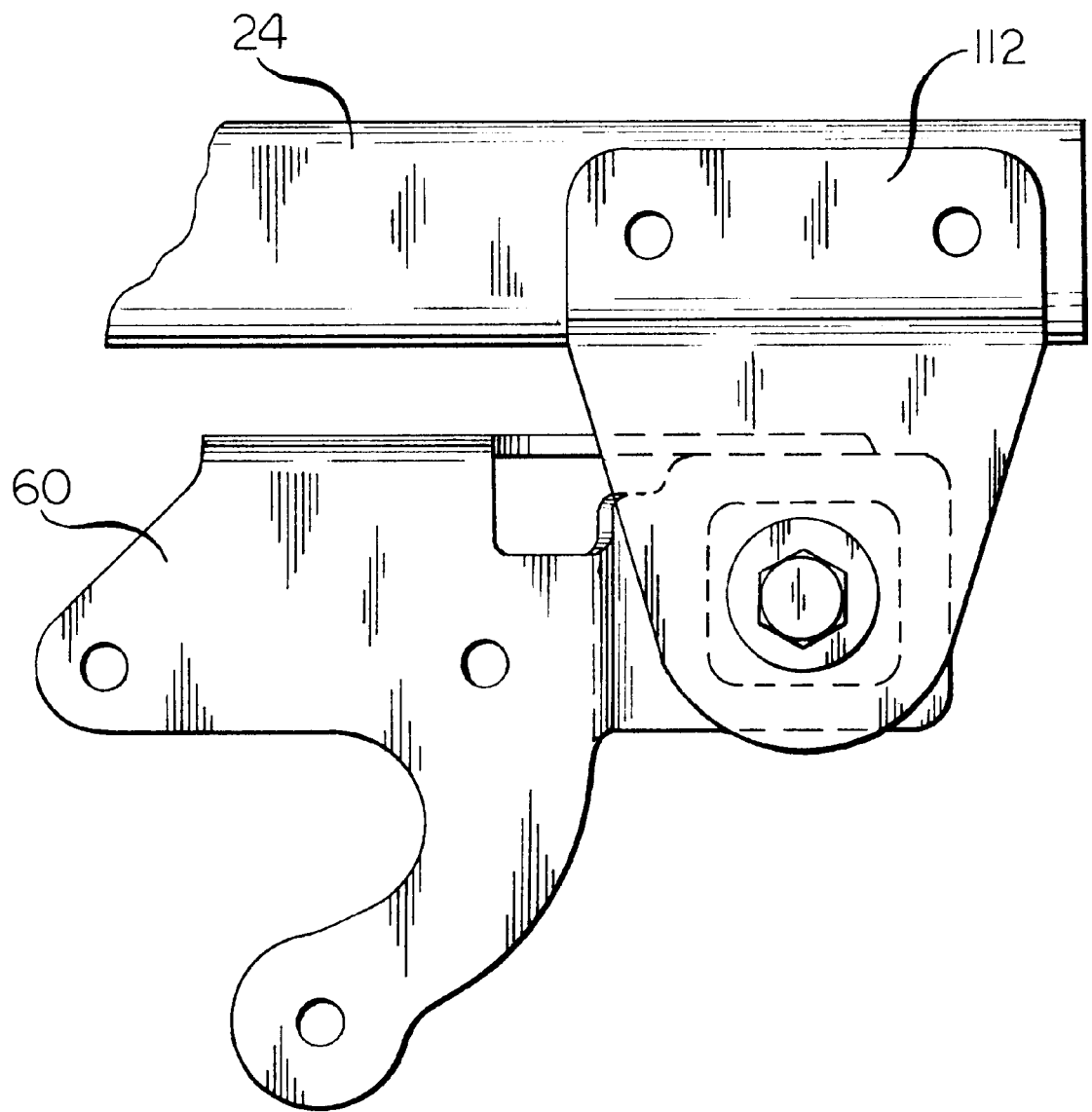
FIG. 6 is an enlarged side elevational view of the resilient drive wheel suspension member shown in FIG. 5 attached to a side of the base frame assembly.

The outer structural member 102 is disposed between two spaced apart brackets 112. Spacers 114 may be provided between the inner structural member 104 and the brackets 112 so as to center the outer structural member 102 between the brackets 112. The brackets 112 shown are triangular shaped and have an offset upper end 111. The offset upper end 111 is provided to compensate for the difference in the axial width of the outer structural member 102 and the sides 24, 28 of the upper frame structure 20 of the base frame assembly 10 to which the brackets 112 attach. The offset upper end of each of the brackets 112 have holes 117 that co-align with holes (not shown) in the opposite sides 24, 28 of the upper frame structure 20. Threaded fasteners 116 pass through the holes 117 in the brackets 112 and further through the holes in the sides 24, 28 of the upper frame structure 20. The threaded fasteners 116 are engageable with lock nuts 118 to attach the brackets 112 to the upper frame structure 20 (as shown in FIGS. 6 and 7).

An axial bore 120 passes through the inner structural member 104. A threaded fastener 122 passes through the brackets 112, the inner structural member 104, and a series of washers 121, 123 and spacers 125. A lock nut 113 engages the threaded fastener 122 to retain the outer structural member 102 within the inner structural member 104 and between the brackets 112.

The resilient elements 76, 108 set forth above each preferably have a cross-section larger than the cross-section of the pockets 74, 106 so as to be compressed when in the pockets 74, 106. The resilient elements 76, 108 may be formed integrally positioned with one another, as shown in the drawings, or may be separate cylindrically shaped resilient members (not shown) independent of one another. Resilient elements 76, 108 formed integrally with one another may be more effective in restricting the rotational displacement of the inner structural members 72, 104 relative to the outer structural members 70, 102.

It should be understood that the invention is not limited to resilient elements that are an extruded elastomer. An elastomer may be injected into the pockets 74, 106. An injected elastomer would bond to the outer structural members 70, 102 as well as the inner structural members 72, 104.

Figure 9:
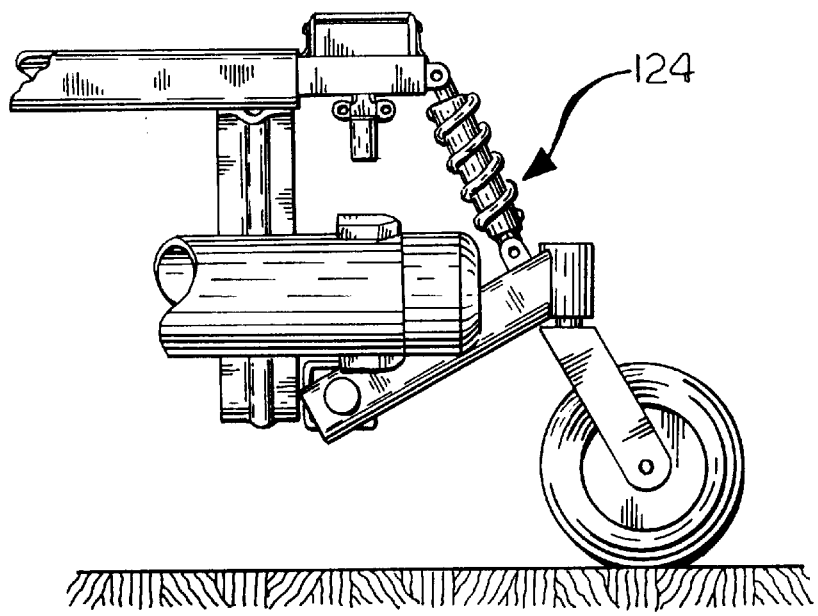
FIG. 9 is an elevational view of an alternative resilient element.
Figure 10:
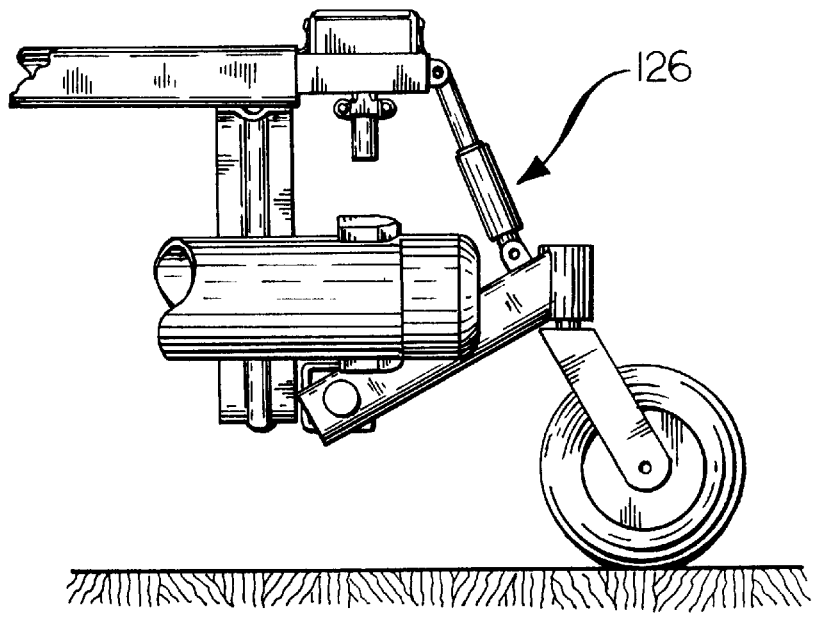
FIG. 10 is an elevational view of another alternative resilient element.
Figure 11:
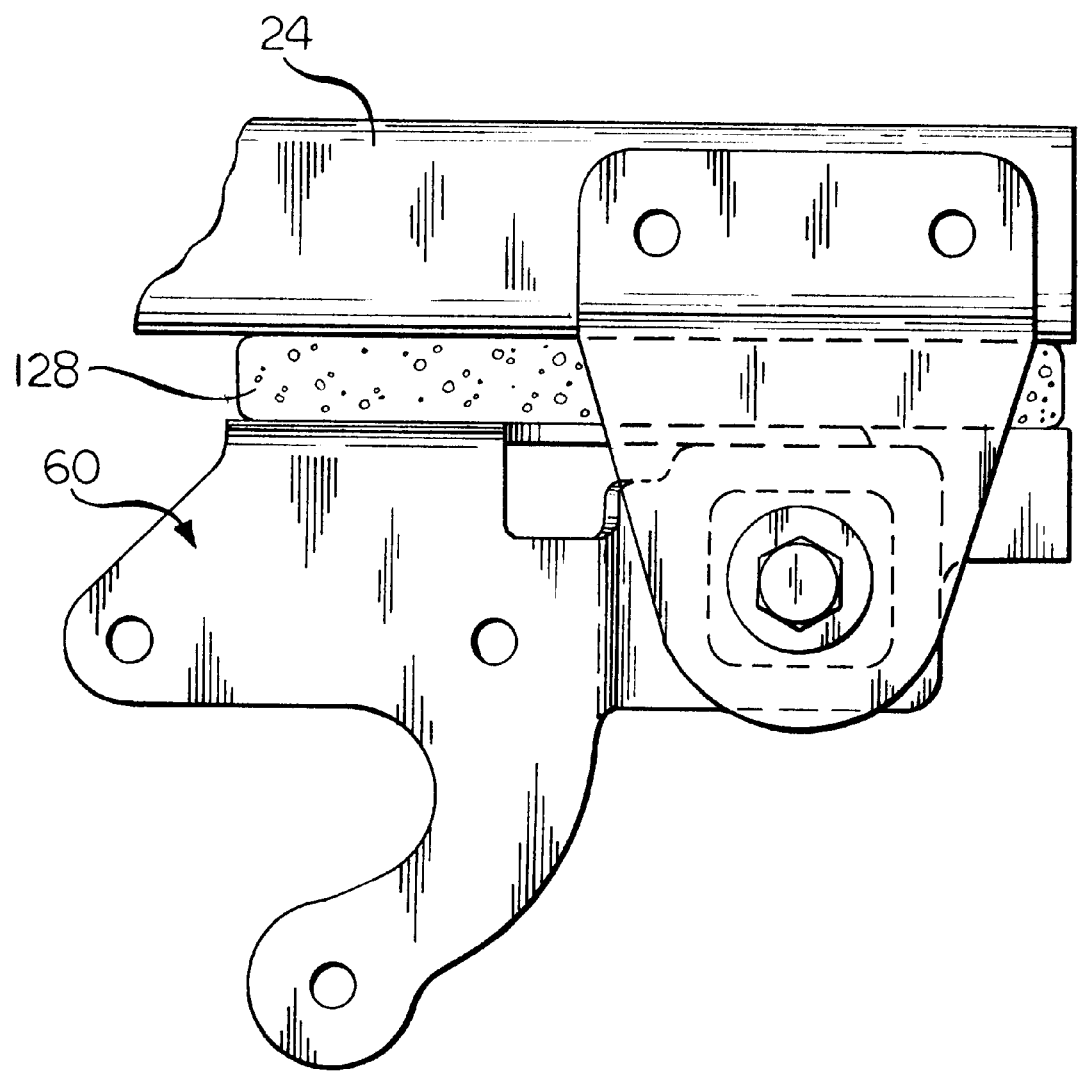
FIG. 11 is an elevational view of yet another alternative resilient element.

It should also be understood that the resilient suspension members in the foregoing description are merely illustrative and that other resilient suspension configurations may be suitable for carrying out the invention. For example, a resilient element in the form in a spring 124 is shown of FIG. 9. A resilient member in the form of a hydraulic actuator 126 is shown in FIG. 10. FIG. 11 shows a resilient material 128 intermediate a displaceable structural member, such as the resilient drive wheel suspension member 60, and a fixed structural member, such as one of the sides 24 of the upper frame structure 20 of the base frame assembly 10. Each of these configurations may be suitable for carrying out the invention.

Figure 12:
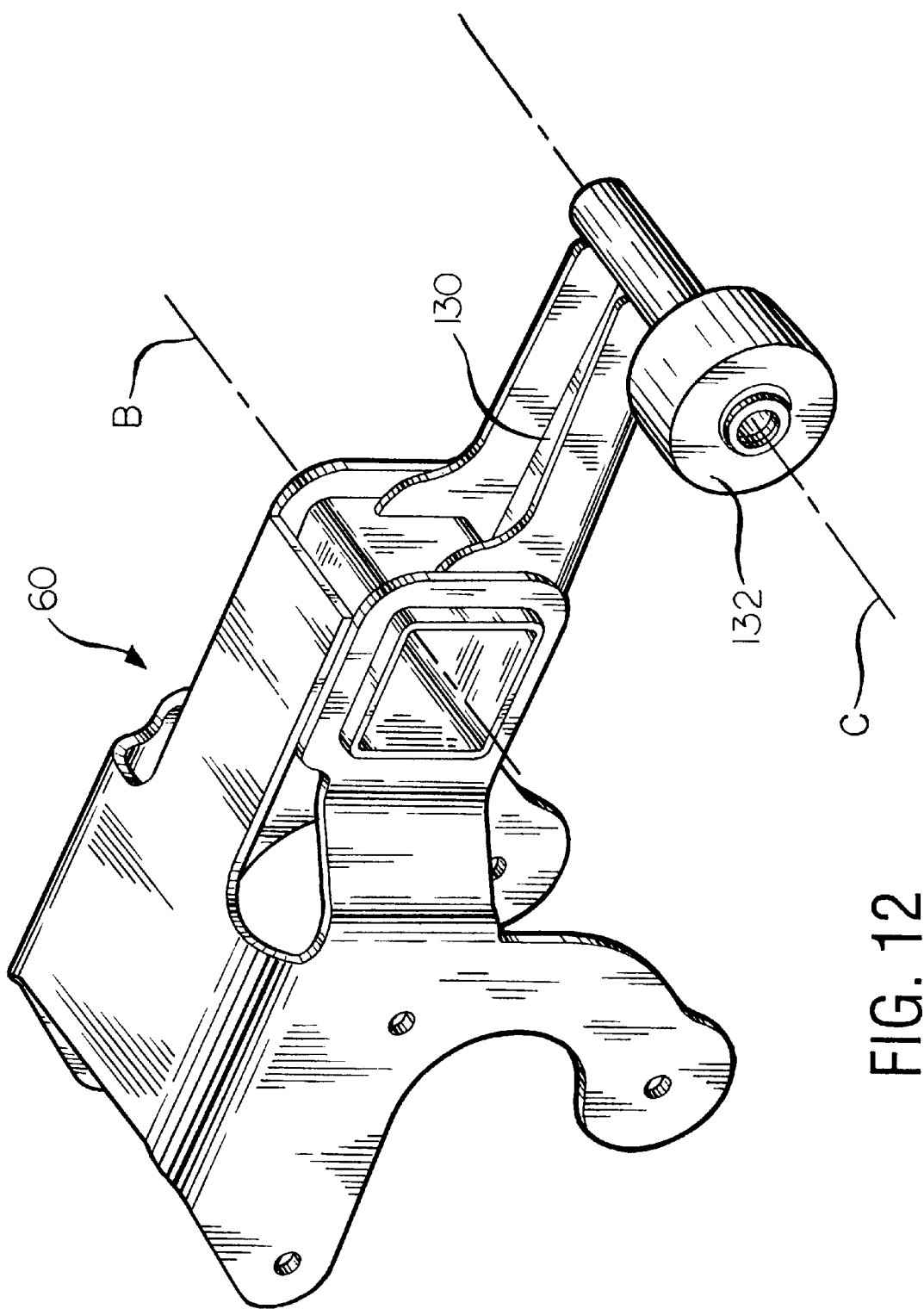
FIG. 12 is a perspective view of an alternative resilient drive wheel suspension member.

As shown in FIG. 12, the resilient drive wheel suspension members 60 may be provided with a traction link arm 130 for supporting a traction link roller 132. The traction link roller 132 is rotatable about an axis of rotation C that is spaced apart and substantially parallel to the axis of rotation B of the resilient drive wheel suspension member 60. The traction link roller 132 is engageable with the traction acceleration ramp 100. The traction link arm 130, the traction link roller 132, and the traction acceleration ramp 100 cooperatively form a traction linkage assembly, generally indicated at 134 (shown in FIG. 7).

In operation, as illustrated in FIG. 7, the traction linkage assembly 134 ensures that a continuous contact is maintained between the drive wheels 66 and the ground. As the wheels 62, 64, 66 rotate in the direction of the arrows D, wheelchair progresses forward in the direction of the arrow E. The resilient suspension members 56, 58, 60 absorb shock sustained by the wheelchair when traversing an irregular ground surface to provide comfortable transportation. This is accomplished because of the compressive and decompressive nature of the resilient elements 76, 108. The front wheels 62 are spaced apart from the drive wheels 66 sufficiently to reduce the risk of the wheelchair tipping forward. Likewise, the rear wheels 64 are spaced apart from the drive wheels 66 sufficiently to reduce the risk of the wheelchair tipping rearward. Note that clearance is provided between the traction link roller 132 and the traction acceleration ramp 100. As the wheelchairs encounters an obstacle, the resilient front suspension members 56 pivot about an axis of rotation in the direction of the arrow F. As this occurs, the resilient front suspension members 56 approach the traction link rollers 132. Upon contacting the traction acceleration ramp 100, the traction link roller 132 progresses up the traction acceleration ramp 100 and the resilient drive wheel suspension members 60 pivot about the axis of rotation B in the direction of the arrow G. As this occurs, the drive wheel 66 is forced downward so as to remain in contact with the ground. As the wheelchair tips rearward, the rear wheels 64 maintain contact with the ground. The resilient rear suspension members 58 may pivot about the axis of rotation A in the direction of the arrow H so as to absorb shock encountered by the rearward tipping. Upon overcoming the obstacle, the resilient suspension members 56, 58, 60 return to a normal position. It should be understood that, as the wheelchair tips rearward, the resilient elements 76, 108 are compressed. As the wheelchair overcomes the obstacle, the resilient elements 76, 108 decompress. The resistance to compression increases as the as the compression increases so as to smoothly absorb shock or abrupt jolts. Likewise, the resistance to compression decreases as the resilient element 76, 108 decompresses to smoothly urge the resilient suspension members 56, 58, 60 back to a normal position.

It should be clear that the front wheels 62 reduce the risk of the wheelchair tilting forward. The resilient rear suspension members 58 function as an anti-tip device to limit the amount of rearward tipping of the wheelchair.

A separate and independent resilient suspension member for each wheel permits each of the six wheels to react to irregular ground surfaces independent of all the other wheels. However, it is to be understood that an independent resilient suspension member need not be provided for all of the wheels. For example, independent resilient suspension members may be provided for the front wheels 62 only. However, such a configuration would not permit the drive wheels 66 to pivot. It should also be understood that a resilient suspension member may be provided to support a single wheel, like a single front wheel or a single rear wheel. One advantage to having six wheels is that the drive wheels may be centrally located along the opposite sides 12, 14 of the base frame assembly 10 between the front wheels 62 and the rear wheels 64.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A wheelchair comprising:
   a frame having a front end and opposite sides;
   a pair of front suspension members for supporting a pair of front wheels, each said front suspension member includes a structural member movably attached to said front end of said frame;
   a pair of drive wheel suspension members for supporting a pair of drive wheels, each said drive wheel suspension member includes a structural member movably attached to one of said opposite sides of said frame, said structural support member of each said drive wheel suspension member including an arm and a roller rotatably supported by said arm, each said roller being engageable with said structural members of one of said front suspension members; and
   a resilient element engageable with each said structural member to resist movement of said structural members.

2. A wheelchair according to claim 1, wherein said structural member of each said front suspension member includes a ramp, each said roller being engageable with one of said ramps.

3. A wheelchair according to claim 1, wherein each said resilient element includes a hydraulic actuator.

4. A wheelchair according to claim 1, wherein each said resilient element includes a spring.

5. A wheelchair according to claim 1, wherein each said resilient element includes an elastomeric element.

6. A wheelchair according to claim 1, wherein said structural member of each said suspension member is an inner structural member, each said suspension member further including an outer structural member, said inner structural member of each said suspension member being disposed within said outer structural member thereof so as to define a pocket therebetween for receiving said resilient element, said resilient element being an elastomeric material.

7. A wheelchair comprising:
   a frame, and
   a suspension including a drive wheel suspension member and a front suspension member, each said suspension member including a structural member movably attached to said frame and an elastomeric element engageable with said structural member to resist movement of said structural member, one of said structural members including an arm and a roller rotatably supported by said arm, said roller being engageable with the other one of said structural members.

8. A wheelchair comprising:
   a frame; and
   a suspension including a drive wheel suspension member and a front suspension member, each said suspension member including a structural member movably attached to said frame and an elastomeric element engageable with said structural member to resist movement of said structural member, one of said structural members including an arm and a roller rotatably supported by said arm and the other one of said structural members including a ramp, said roller being engageable with said ramp.

9. A wheelchair comprising:
   a frame, and
   a suspension including a drive wheel suspension member and a front suspension member, each said suspension member including an outer structural member and an inner structural member disposed within said outer structural member so as to define a pocket therebetween for receiving an elastomeric element, one of said structural members being being attached to said frame and the other one of said structural members being torsionally displaceable relative to said attached structural member, said elastomeric element limiting the torsional displacement of said displaceable structural member, one of said suspension members further including an arm and a roller rotatably supported by said arm, said roller being engageable with the other one of said suspension members.

10. A wheelchair comprising:

a frame; and a suspension including a drive wheel suspension member and a front suspension member, each said suspension member including an outer structural member and an inner structural member disposed within said outer structural member so as to define a pocket therebetween for receiving an elastomeric element, one of said structural members being being attached to said frame and the other one of said structural members being torsionally displaceable relative to said attached structural member, said elastomeric element limiting the torsional displacement of said displaceable structural member, one of said suspension members further including an arm and a roller rotatably supported by said arm and the other one of said suspension members including a ramp, said roller being engageable with said ramp.

* * * * *

UNITED STATES PATENT AND TRADEMARK OFFICE
CERTIFICATE OF CORRECTION

PATENT NO. : 6,070,898
DATED : June 6, 2000
INVENTOR(S) : Paul C. Dickie and Robert A. Taylor It is certified that error appears in the above-identified patent and that said Letters Patent is hereby corrected as shown below:

Title page, item [73], Assignee: "Sunrise Medical, Inc." should be changed to --Sunrise Medical HHG Inc.--

Signed and Sealed this

Twenty-seventh Day of March, 2001

*Attest:*

NICHOLAS P. GODICI

*Attesting Officer*

*Acting Director of the United States Patent and Trademark Office*